US006263000B1

(12) United States Patent
Kokubun

(10) Patent No.: US 6,263,000 B1
(45) Date of Patent: *Jul. 17, 2001

(54) REMOTE TRADING CALL TERMINALS IN A TRADING CALL SYSTEM

(75) Inventor: Yoshiyuki Kokubun, Koriyama (JP)

(73) Assignee: Hitachi Telecom Technologies, LTD, Koriyama (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/774,908

(22) Filed: Dec. 27, 1996

(30) Foreign Application Priority Data

Dec. 28, 1995  (JP) .................................................. 7-342951

(51) Int. Cl.[7] .................................................. H04M 11/00
(52) U.S. Cl. .......................... 370/522; 379/93.12; 705/37
(58) Field of Search ..................................... 370/524, 463, 370/420, 357, 359, 360, 264, 522, 904; 379/227, 258, 271, 272, 399, 265, 266, 309, 93.12; 705/35–44

(56) References Cited

U.S. PATENT DOCUMENTS

| 4,908,824 | * | 3/1990 | Leibe et al. | 370/404 |
| 4,996,685 | * | 2/1991 | Farese et al. | 370/352 |
| 5,001,744 | * | 3/1991 | Nishino et al. | 379/93.09 |
| 5,150,402 | * | 9/1992 | Yamada | 379/93.06 |
| 5,210,740 | * | 5/1993 | Anzai et al. | 379/93.07 |
| 5,255,264 | * | 10/1993 | Cotton et al. | 370/286 |
| 5,295,133 | * | 3/1994 | Jurkevich | 370/219 |
| 5,473,366 | * | 12/1995 | Imaeda et al. | 348/14 |
| 5,555,244 | * | 9/1996 | Gupta et al. | 370/397 |
| 5,587,999 | * | 12/1996 | Endo | 370/524 |
| 5,610,976 | * | 3/1997 | Uota et al. | 379/265 |
| 5,866,889 | * | 2/1999 | Weiss et al. | 235/379 |

* cited by examiner

Primary Examiner—Melvin Marcelo
Assistant Examiner—Jasper Kwoh
(74) Attorney, Agent, or Firm—Antonelli, Terry, Stout & Kraus, LLP

(57) ABSTRACT

A trading communication system. A line control unit includes a channel switch circuit, a number of line trunks connected to the channel switch circuit and adapted to be connected to a line network, and a number of line circuits connected to the channel switch circuit. A number of first terminal adaptors are connected to the line circuits. Some of the first terminal adaptors are adapted to be connected to a commercial switched circuit, while one of the first trading call terminals is connected to one of the first terminal adapters. A number of second trading call terminals are at locations remote from the line control unit. A number of second terminal adaptors are connected to the second trading call terminals and are adapted to be connected to the commercial switched circuit to connect the channel switch circuit to the second trading call terminals. The line control unit transfers environmental information about the trading communication system through the first terminal adapters, the commercial switched circuit, and the second terminal adapters to the second trading call terminals.

3 Claims, 4 Drawing Sheets

REMOTE TRADING CALL TERMINALS IN A TRADING CALL SYSTEM

FIELD OF THE INVENTION

This invention relates to trading call systems used for financial transactions at financial institutions such as banks and securities firms, and more particularly is related to remote control trading call terminals of a trading call system comprising trading call terminals installed at homes of individual traders in an environment similar to the one of a trading room to enable trading transactions at homes by installing a trading call terminal.

BACKGROUND OF THE INVENTION

Conventional trading call systems are built by accommodating multiple trading call terminals in a line control unit via an ISDN basic interface (2B+D) circuit. Each trading call terminal in the system transmits and receives environmental information, such as which line received a message or which line is being used by another trading call terminal and under what circumstance, using a D channel of the ISDN basic interface. The status can be monitored by the indication on the line display lamp of a trading call terminal. Based on these functions, actions can be taken, such as making a judgement as to whether to accept or reject a receiving call knowing the receiving line (the calling party) or avoiding a call being made to a line being used.

In the meantime, a trading call terminal is required to acquire multiple lines simultaneously and to communicate to each of them, and further, to transmit and receive environmental information therefor to and from the line control equipment. When a trading call terminal is connected to the line control unit via a commercial switched circuit, environmental information cannot be transmitted or received, as the voice information alone occupies multiple lines, and therefore, the use of a trading call terminal under the same environment as the trading room was difficult.

Furthermore, even in the case of using an ISDN circuit as the commercial switched circuit, environmental information cannot be transmitted as is, as the voice information occupies two B channels and call control data occupies the D channel.

On the other hand, as trading transactions deal with both the domestic market and the overseas market, the trader has to stand by in the trading room to adjust to the customer's local time if he is dealing with a customer in a country having a different time zone. In order to cope with such situation, the demand is growing for an environment where a call can be made similarly as in the trading room by installing a trading call terminal at home.

SUMMARY OF THE INVENTION

This invention is intended to enable trading transactions to be done at home through the same operation as in a trading call terminal in a trading room by connecting a trading call terminal installed at home to a line control unit, and providing the same environment as the trading call terminal installed in the trading room.

In order to realize such environment, this invention enables transmitting and receiving of environmental information to and from the trading call terminals installed remotely from the trading room by providing a means to relay environmental information of the trading call system to the trading call terminals connected to a remote terminal adapter via a commercial switched circuit in a trading call system. The invention includes a line control unit having a multiple switched circuit trunk connected to a switched circuit and multiple line circuits, trading call terminals connected to the aforementioned line circuits, remote terminal adapters connected to the aforementioned line circuits, and trading call terminals connected to the said remote terminal adapters via a commercial switched circuit.

Furthermore, under this invention, an ISDN circuit is used as the commercial switched circuit for connection between the remote terminal adapter connected to the line control unit and the trading call terminal, and between the line control unit and the trading call terminals connected to the remote terminal adapters via the commercial switched circuit, two channels of voice information compressed to 32 Kbps are transmitted through one of the two B channels of the ISDN basic interface, and environmental information is transmitted as 64 Kbps control information through the other B channel.

Furthermore, remote terminal adapters are provided on both sides, the line control unit side and the side of the trading call terminals connected via the commercial switched circuit, and the functions of compressing and expanding voice and of extracting and matching channels are provided to each remote terminal adapter.

DETAILED DESCRIPTION

Figure 1:
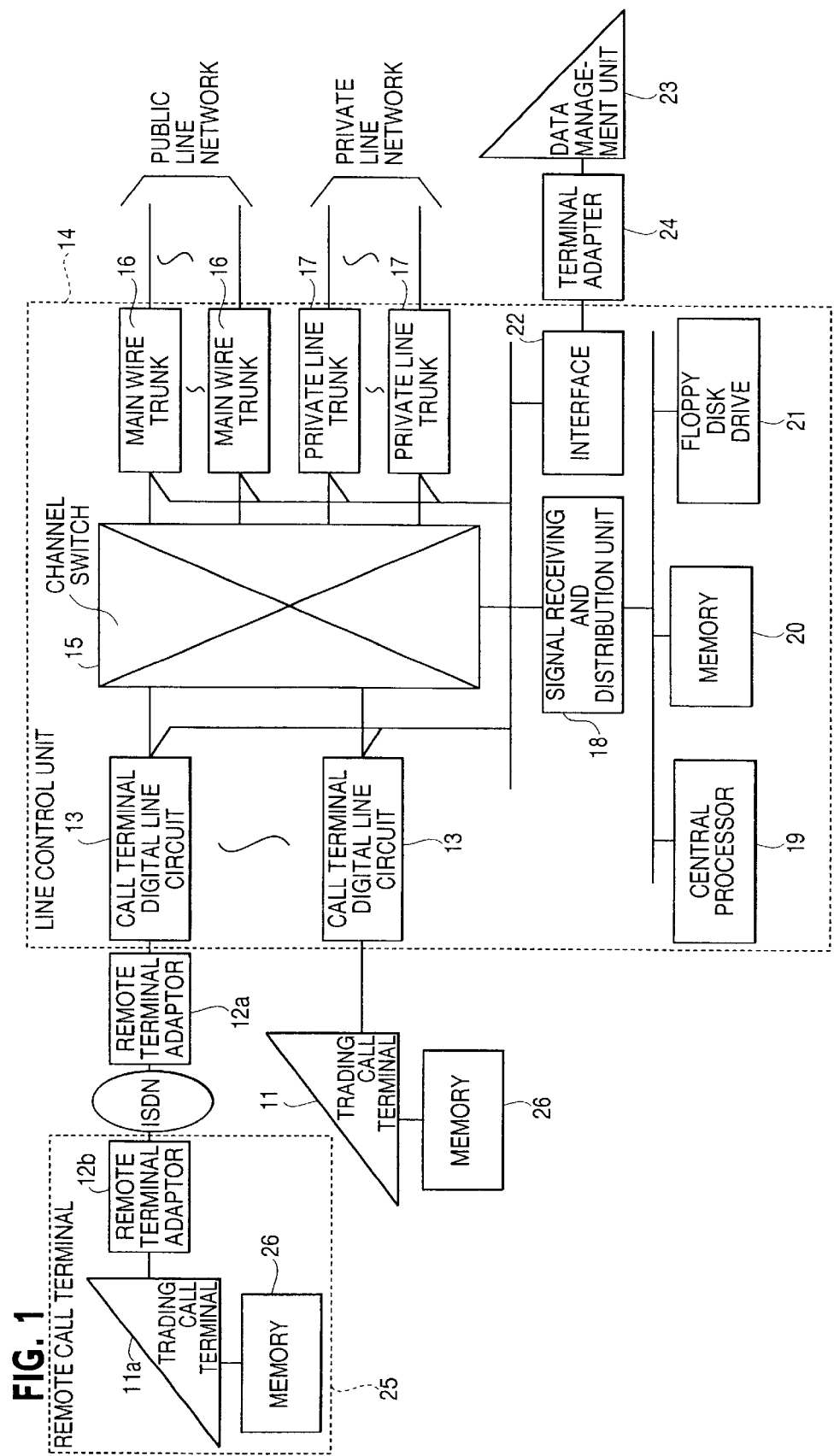
FIG. 1 is a system block diagram of an embodied system based on the invention.

A trading call system for a remote control method for trading call terminals under this invention is explained by using FIG. 1 which is a conceptual drawing showing the system configuration.

The remote control method for trading call terminals of a trading call system under this invention comprises a line control unit 14, accommodating multiple call terminals (trading call terminals) 11, which is connected to either the public line network or the private line network.

Furthermore, the trading call system under this invention comprises a remote call terminal 25 made by connecting a desired call terminal 11*a*, to a remote terminal adapter (RTA) 12*a*, via an ISDN (ISDN circuit of ISDN basic interface (hereinafter called"ISDN circuit") and an RTA 12*b*, and a call terminal office data management unit (SAT) 23 connected via a terminal adapter (TA) 24. Trading call terminal (DB) 11 is connected to channel switch (TSW) 15 via call terminal digital line circuit (IBDLIN) 13 using an S point interface of an I interface of the line control unit (LCU) 14. Furthermore, trading call terminal 11*a*, which functions as the remotely located remote call terminal 25, and call terminal digital line circuit 13 are connected by the ISDN circuit, which is a commercial switched circuit, and remote terminal adapters (RTA) 12*a* and 12*b*.

Each trading call terminal 11, 11*a* is provided with a call terminal office data memory (MEMB) 26 where call office data, such as registration of function keys of each call terminal and registration of the other party corresponding to the line, is stored.

The line control unit 14 comprises a call terminal digital line circuit 13, channel switches (TSW) 15, main wire trunks (COT) 16 connected to a public line network, private line trunks (PVT) 17 connected to private line network, a signal receiving and distribution unit (SRD) 18, a central processing equipment (CPE) 19, a line control unit office data memory (MEMA) 20, a floppy disk drive (FDD) 21, and a personal computer interface (PC I/F) 22.

Channel switch 15 is connected to the public switched circuit network via switched circuit trunks 16 and to the private line network via main wire trunks 17.

Central processing equipment 19 controls call connection via a CC bus and controls other operations of the total switching equipment.

Line control unit office data memory 20 stores a control program and office data.

Personal computer interface 22 and terminal adapter 24 interface the connection between channel switch 15 of line control unit 14 and call terminal office data management unit 23 which manages the data of trading call terminal 11.

Remote terminal adapters 12a and 12b connect channel switch 15 and trading call terminal 11a of remote call terminal 25 via an ISDN circuit which is a public line network.

Moreover, remote terminal adapters 12 are provided with a voice compression and expansion function, and voice information is compressed or expanded between 64 Kbps and 32 Kbps. Therefore, voice information of two channels can be transmitted by using only one of the two B channels of the ISDN circuit.

Furthermore, remote terminal adapters 12a and 12b are provided with the function of transmitting and receiving environmental information of the trading call system accommodated by the line control unit through one of the two B channels of the ISDN circuit.

In a trading call system configured as described above, between remote terminal adapters 12a and 12b, which are located between line control unit 14 and trading call terminal 11a which is remotely located, voice information for two channels is transmitted and received by one of the two ISDN B channels and environmental information is transmitted and received by the other B channel.

As described above, this invention enables the use of trading call terminals installed at homes under the same environment as the terminals installed in the trading room by connecting the line control unit of the trading system installed in the trading room and the trading call terminal installed at home via an ISDN circuit, and thus a trading call system which enables trading transactions at home can be provided.

Figure 2:
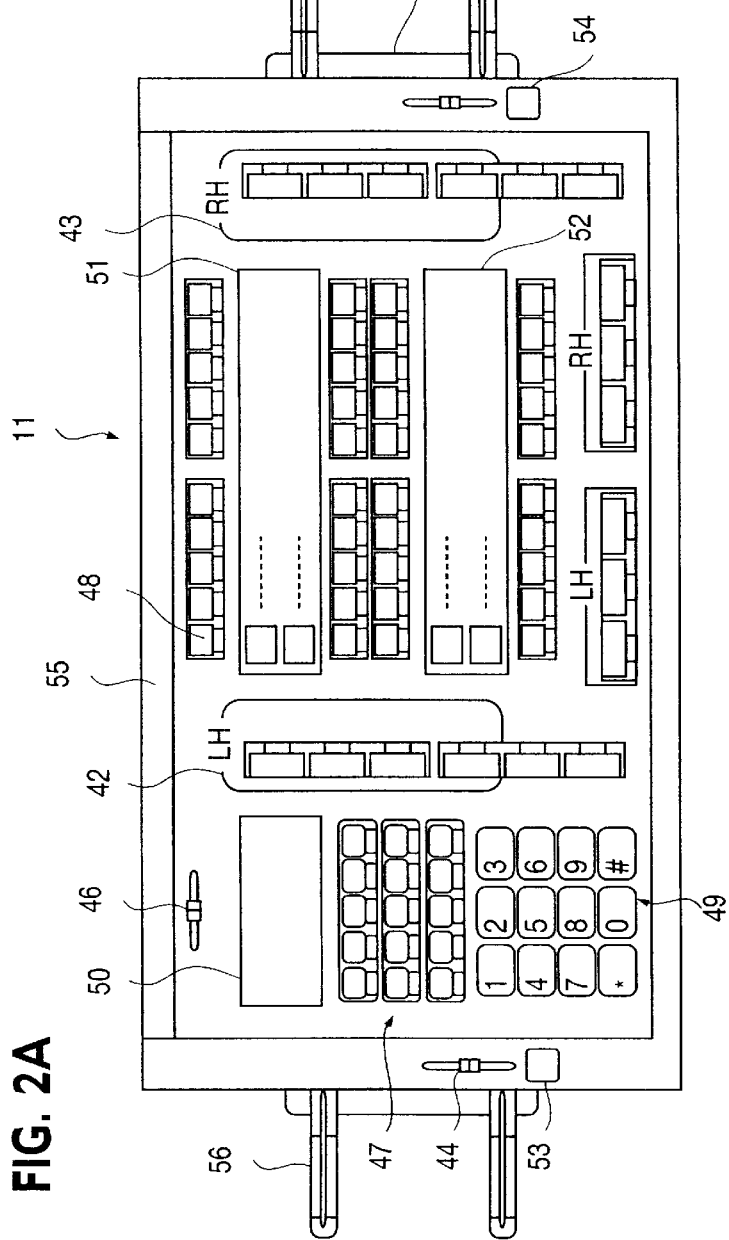
FIGS. 2A and 2B are, respectively, a front view and a side view of the call terminal of the embodied system.

FIGS. 2A and 2B depict the external shape of the trading call terminal. On the outside wall of the cabinet 55 in FIG. 2A, function keys for left hand set 42, function keys for right hand set 43, volume for left hand set 44, volume for right hand set 45, volume for receiving sound 46, programmable function keys 47, line keys 48, numeric keys 49, LCD for dial monitor display 50, the other party name display devices 51 and 52, modular jack for left hand set connection 53, modular jack for right hand set connection 54, and hand set hangers 56 are provided.

Based on the trading call terminal data stored in the call terminal office data memory 26, trading call terminal 11 registers auto dial and the other party's name to the line key 48, and displays the other party's name corresponding to the line key on the display devices 51 and 52. By pressing the line key 48 corresponding to the other party as displayed on the display devices 51 and 52, an outgoing call or incoming call response can be made in a one touch process.

Line key 48 can display whether any call terminal is in use or receiving status by means of a lighting or flickering lamp or color change based on the control data from the line control unit 14. Therefore, the operator can take various actions such as acquisition of an open line, responding to a received call, monitoring or participating in lines in use.

The trading call terminal data stored in call terminal office data memory 26 is registered by the trading call terminal data management unit 23 as shown in FIG. 1, sent out to call terminal line circuit 13 via terminal adapter 24, personal computer interface 22 and channel switch 15, then stored in the call terminal office data memory 26 via remote terminal adapter 12.

Figure 3:
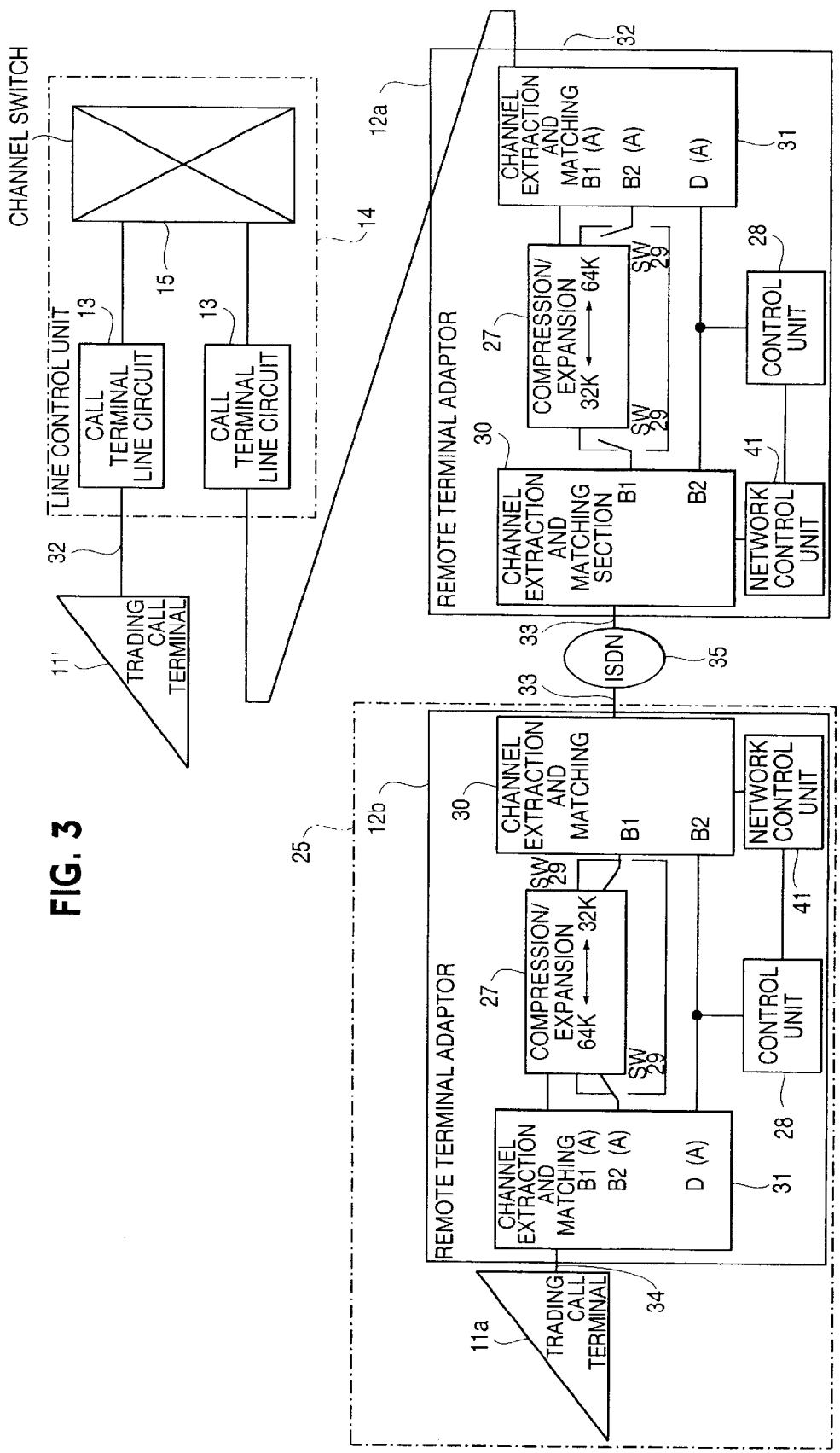
FIG. 3 depicts the transmission line from the call terminal line circuit to the trading call terminal in the embodied system.

FIG. 3 describes the transmission line from the line control unit 14 to the trading call terminal 11a, and detailed construction of remote terminal adapter 12a, 12b is depicted, while transmission line 32, from the channel switch 15 to the remote terminal adapter 12a on the line control unit side via call terminal line circuit 13, transmission line 33, from the remote terminal adapter 12a on the line control unit side to the remote terminal adapter 12b on the trading call terminal 11a side, and transmission line 34, from the remote terminal adapter 12b on the trading call terminal 11a side to the trading call terminal 11a, are depicted.

Figure 4:
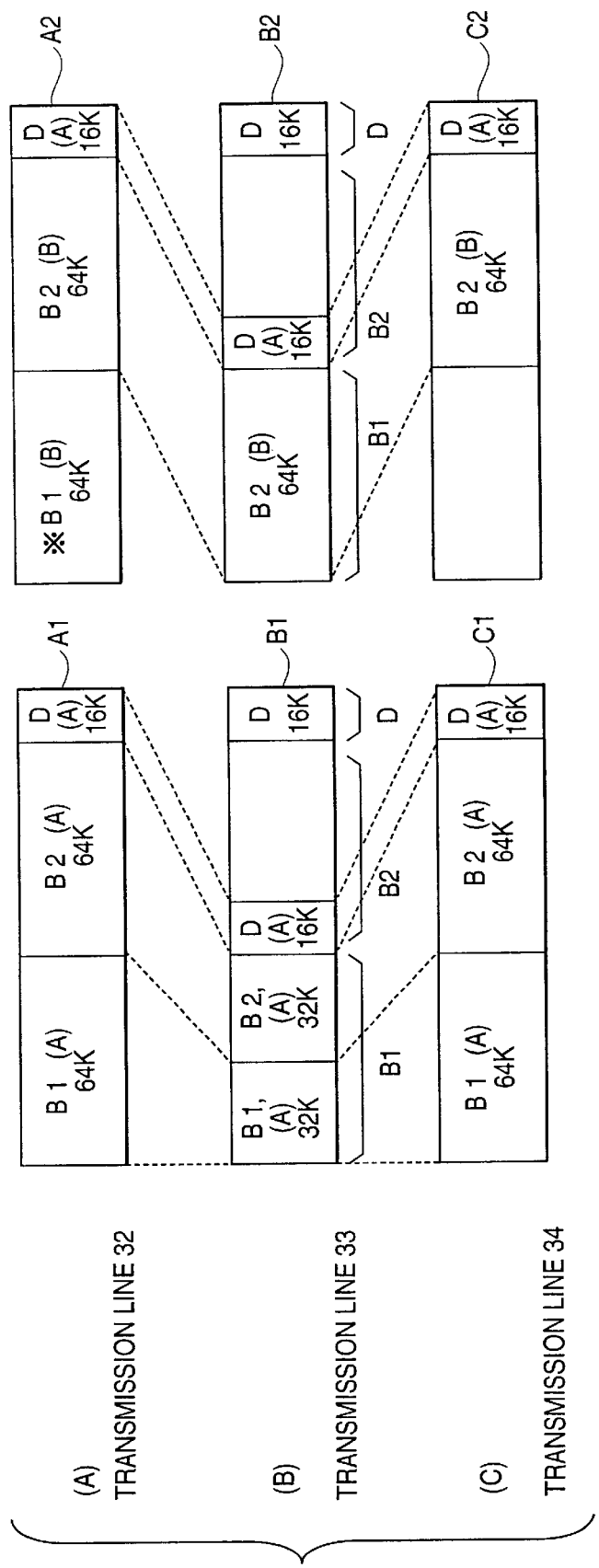
FIG. 4 depicts the data format on the transmission line in the embodied system.

FIG. 4 depicts the data format on each of the above transmission lines for the cases of voice information transmission and data transmission.

Remote terminal adapter 12 comprises a compression and expansion section 27, control unit (CONT) 28, selector switch (SW) 29, channel extraction and matching section 30, channel extraction and matching section 31, and network control unit (NCU) 41.

First, two channels of 64 Kbps voice information (B1 (A), B2 (A)), connected to the call terminal line circuit 13 by channel switch 15, and control information D (A), including environmental information from the central processing equipment 19, are interfaced with the remote terminal adapter 12a in data format A1 as shown in FIG. 4 (A) on the transmission line 32, enabling transmission of two channels of voice information and call control to the trading call terminal.

Furthermore, when transmitting office data (64 Kbps, B2 (B)) from the trading call terminal data management unit 23 to the trading call terminal 11a, data transmission of 64 Kbps is made possible by employing the data format A2 as described in FIG. 4 (A) after informing the trading call terminal 11a that data transmission will be made by means of a call control information D (A).

Next, when interfacing with trading call terminal 11a of the remote call terminal 25, the data on transmission line 32 in data format A1 as described in FIG. 4 (A) is separated into two channels of 64 Kbps voice information B1 (A), B2 (A) and 16 Kbps environmental information D (A) at each channel extraction and matching section 31 provided at the remote terminal adapter 12, and each of the 64 Kbps voice information B1 (A), B2 (A) is compressed to 32 Kbps voice information B1 (A'), B2 (A') at the compression and expansion section 27. Then the two calls of 32 Kbps voice information BI (A'), B2 (A') and 16 Kbps environmental information D (A) are fed into the channel extraction and matching section 30 through the B1 channel and B2 channel, respectively, where the data is converted to data format B1 as depicted in FIG. 4 (B), and sent out to transmission line 33. Here, D is a 16 Kbps call control information of ISDN 35 created at network control unit (NCU) 41 and transmitted over D channel of 16 Kbps.

At remote trading call terminal 25, division is made into two calls of 32 Kbps voice information B1 (A') and B2 (A') transmitted over B1 channel, 16 Kbps environmental information D (A) transmitted over B2 channel and 16 Kbps call control information D of ISDN 35 transmitted through 16 Kbps D channel of transmission line 33 at the channel extraction and matching section of remote terminal adapter 12b, and two channels of 32 Kbps voice information B1 (A') and B2 (A') are expanded to two channels of 64 Kbps voice information B1 (A) and B2 (A) at compression and expansion section 27, and each call is distributed to the B1 channel and B2 channel, then fed into channel extraction and matching section 31. 16 Kbps call control information D (A) is fed into channel extraction and matching section 31 as is through the D channel. The signal to transmission line 34 is decoded back to the same data format as the one on transmission line 32 in data format C1 as depicted in FIG. 4 (C) so that trading call terminal 11a can accept it.

When transmitting call terminal office data from trading call terminal data management unit 23 to trading call terminal 11a via remote terminal adapter 12, 64 Kbps office data B2 (B) is transmitted through B2 channel and call control information D (A) is transmitted through D channel, and they are sent out to remote terminal adapter 12a in data format A2 as depicted in FIG. 4 (A). Advance notice to the effect that it is a data transmission is given to control section 28 of the remote terminal adapter 12a by means of call control information, and by switching of selector switch 29 at the remote terminal adapter 12a, compression and expansion section 27 is bypassed and B2 of channel extraction and matching section 31 and B1 of channel extraction and matching section 30 are connected, resulting in the office data B2 (B) being transmitted through the B1 channel and the call control data D (A) being transmitted through B2 channel, and sent to remote call terminal 25 via transmission line 33 in data format B2 as depicted in FIG. 4 (B). Here, D is 16 Kbps control information of the INS64 network created at NCU41 and transmitted through 16 Kbps D channel.

At remote terminal adapter 12b of the remote call terminal 25, switching of selector switch 29 is made to connect BI of the channel extraction and matching section 30 and B2 of the channel extraction and matching section 31 so that the office data B2 (B) transmitted through B1 channel on transmission line 33 is relayed to B2 channel, and the call control information D (A) transmitted through B2 channel on transmission line 33 is relayed to D channel by bypassing the compression and expansion section 27, and further is sent to the trading call terminal 11a via transmission line 34 in data format C2 as depicted in FIG. 4 (C).

On transmission line 34, 64 Kbps data transmission is made possible by employing the data format C2. When ending the data transmission, the end of data transmission is indicated to the control section 28 (CONT) by means of call control information, selector switch (SW) 29 is switched to connect to the compression and expansion section 27, and the data transmission is ended.

As explained above, trading transactions at home are made possible based on an environment the same as that of a trading room provided at home by installing a trading call terminal which is in the same operational environment as the trading call terminal installed in the trading room.

What is claimed is:

1. A trading communication system, comprising:

a line control unit, including a channel switch circuit, a plurality of line trunks connection to said channel switch circuit and adapted to be connected to line networks, and a plurality of line circuits connected to said channel switch circuit, each line circuit having two call channels and control channel;

a plurality of first terminal adapters connected to said plurality of line circuits, at least some of said plurality of first terminal adapters adapted to be connected to an integrated service digital network having two call channels;

a first trading call terminal connected to one of said plurality of line circuits;

a plurality of second trading call terminals at locations remote from said line control unit, each of said second trading call terminals including two telephone handsets, each handset capable of receiving or transmitting a call so that each of said second trading call terminals is capable of receiving and/or transmitting two calls simultaneously; and a plurality of second terminal adapters connected to said plurality of second trading call terminals and adapted to be connected to said integrated service digital network to connect said plurality of first terminal adapters to said plurality of second trading call terminals through said integrated service digital network, thereby connecting said line circuits and said second trading call terminals, wherein:

environmental information about said trading communication system is provided on one call channel of said line circuits for transmission through said first terminal adapters, one call channel of said integrated service digital network, and said second terminal adapters to said second trading call terminals; and voice information transmitted between said line control unit and said second trading call terminals is compressed and transmitted through said two call channels of said line circuits, said first terminal adapters, one call channel of said integrated service digital network, and said second terminal adapters, and call control information related to the call connect status of said trading communication system is transmitted through said control channel of said line circuits, said first terminal adapters, the second call channel of said integrated service digital network, and said second terminal adapters.

2. A trading communication system as claimed in claim 1, wherein each of said first terminal adapters and said second terminal adapters includes a compression circuit for compressing the voice information to 32 Kbps and an expansion circuit for expanding the compressed voice information, permitting transmission of the voice information on said one call channel of said integrated service digital network.

3. A trading communication system as claimed in claim 2, wherein each of said first terminal adapters and said second terminal adapters includes a channel extraction and matching circuit for determining the communication channel to be used.

* * * * *